Patented Aug. 15, 1933

1,922,832

UNITED STATES PATENT OFFICE 1,922,832

PROCESS OF PURIFYING TECHNICAL SODIUM METASILICATE HYDRATES

Leon R. Westbrook, Cleveland Heights, Ohio, assignor to The Grasselli Chemical Company, Cleveland, Ohio, a Corporation of Delaware No Drawing. Application October 25, 1932
Serial No. 639,531

5 Claims. (Cl. 23—110)

It is shown in a co-pending application by M. C. Waddell, Ser. #639,532, filed on even date herewith that crystalline sodium metasilicate hydrates can be obtained by cooling hot, concentrated solutions of sodium metasilicate containing substantial amounts of free caustic alkali. The resulting crystals contain, however, due to adhering mother liquor, some free caustic soda. This is detrimental for certain uses of the metasilicate and it is the aim of this invention to remove this caustic soda as completely as possible.

My invention therefor relates to the elimination of free caustic alkali contained in the mother liquor adhering to the sodium metasilicate crystals obtained by crystallization of strongly alkaline silicate solutions and consists in transforming said free alkali to additional, solid metasilicate hydrate as for instance by treating said crystals with a predetermined amount of sodium silicate solution containing more $SiO_2$ than corresponds to the ratio $1Na_2O:1SiO_2$.

By mixing crude metasilicate hydrate with such a silicate solution in the proper amount the free caustic reacts with the silicate of the treating liquor to form metasilicate which crystallizes with the water of the treating liquor to form solid hydrates; a free flowing, dry product containing at the most only small amounts of free caustic is so obtained.

It is preferred for the successful performance of my purification process to adjust the amount and composition of the treating liquor to the free caustic alkali contained in the product to be treated. To this effect the amount of free caustic remaining in the metasilicate hydrate crystals to be purified is determined analytically. To a weighed quantity of crystals in a suitable mixer, is added sufficient high ratio silicate solutions to convert the above determined free caustic to metasilicate. The water content of the solution used is preferably so adjusted as to be absorbed in the crystallization of the new metasilicate in the form of its pentahydrate.

Any sodium silicate may be used in which the molecular proportion of $SiO_2$ to $Na_2O$ is greater than 1. I prefer, however, to use a silicate containing at least $2SiO_2$ to $1Na_2O$. After the addition of the high ratio silicate the crystals are mixed or tumbled by any convenient means to bring about thorough mixing of the added silicate solution and crystals. The high ratio silicate and free caustic are converted to metasilicate which crystallizes and leaves a dry, free-flowing body of crystals which is ready for screening, if desired, and packaging.

The following is a specific example of the application of my invention:

A crude, technical sodium metasilicate hydrate was available which contained 30.4% total $Na_2O$, 26.65% $SiO_2$; it contained therefor 3.7% free NaOH.

To 500 grams of the crystals were added 60 grams of a sodium silicate solution containing 18.1% $Na_2O$ and 35.5% $SiO_2$, and the mix agitated in a tumbling barrel. A free-flowing, dry product resulted which on analysis showed 29.4% $Na_2O$ and 28.1% $SiO_2$, or a free NaOH content of 0.5%.

I claim:

1. In a process of purifying a technical, crystalline sodium metasilicate hydrate contaminated with free caustic alkali, the step of transforming said free alkali into a sodium metasilicate hydrate.

2. In a process of purifying a technical, crystalline sodium metasilicate hydrate contaminated with free caustic alkali, the step of mixing said product with a sodium silicate solution containing more $SiO_2$ than corresponds to the ratio $1 Na_2O:1 SiO_2$.

3. In a process of purifying a technical, crystalline sodium metasilicate hydrate contaminated with free caustic alkali, the step of mixing said product with a sodium silicate solution of a composition and in an amount adjusted to transform said free alkali into a solid sodium metasilicate hydrate.

4. In a process of purifying a technical, crystalline sodium metasilicate hydrate contaminated with free caustic alkali, the step of adding to and mixing said product with a sodium silicate solution containing more $SiO_2$ than corresponds to the ratio $1 Na_2O: 1 SiO_2$, the amount and composition of said added silicate being adjusted to transform said free alkali into additional metasilicate hydrate and the amount of water in said solution being adjusted to transform said additional metasilicate into a solid hydrate.

5. The process of claim 4 in which the sodium silicate solution added has a ratio of about $1 Na_2O:2 SiO_2$.

LEON R. WESTBROOK.